(12) United States Patent
Coghlan et al.

(10) Patent No.: US 6,528,943 B2
(45) Date of Patent: Mar. 4, 2003

(54) EL LAMP WITH INCREASED PHOSPHOR DENSITY

(75) Inventors: William A. Coghlan, Tempe, AZ (US); David A. Hardinger, Chandler, AZ (US); David G. Pires, Phoenix, AZ (US)

(73) Assignee: Durel Corporation, Chandler, AZ (US)

( * ) Notice: Subject to any disclaimer, the term of this patent is extended or adjusted under 35 U.S.C. 154(b) by 0 days.

(21) Appl. No.: 09/872,748

(22) Filed: Jun. 1, 2001

(65) Prior Publication Data

US 2002/0190636 A1 Dec. 19, 2002

(51) Int. Cl.$^7$ ............................................. H05B 33/14
(52) U.S. Cl. ........................................ 313/509; 313/502
(58) Field of Search ................................ 313/502, 503, 313/509, 511

(56) References Cited

U.S. PATENT DOCUMENTS

| | | | | |
|---|---|---|---|---|
| 4,500,173 A | | 2/1985 | Leibowitz et al. | .......... 350/345 |
| 4,527,096 A | | 7/1985 | Kindlmann | .......... 315/169.3 |
| 4,684,353 A | * | 8/1987 | DeSouza | .......... 313/511 |
| 5,313,141 A | | 5/1994 | Kimball | .......... 315/169.3 |
| 5,770,920 A | | 6/1998 | Eckersley et al. | .......... 313/506 |
| 5,830,028 A | | 11/1998 | Zovko | .......... 445/24 |

* cited by examiner

Primary Examiner—Michael H. Day
(74) Attorney, Agent, or Firm—Paul F. Wille

(57) ABSTRACT

Brightness is improved, without decreasing lamp life, by driving an EL lamp at higher voltage and less current, by increasing phosphor loading, by low loss dielectric, and by depositing the phosphor layer in two passes.

6 Claims, 7 Drawing Sheets

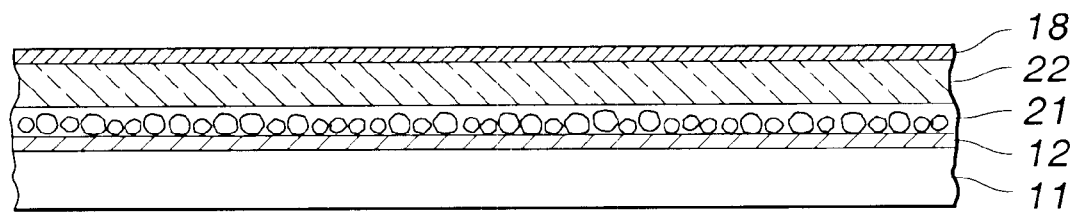
F I G. 2
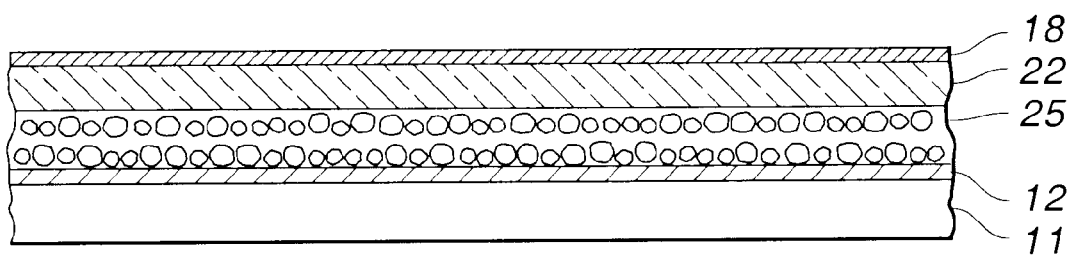
F I G. 3

EL LAMP WITH INCREASED PHOSPHOR DENSITY

BACKGROUND OF THE INVENTION

This invention relates to the combination of a thick film, inorganic, electroluminescent (EL) lamp and a power source and, in particular, to the construction of an EL lamp for improved brightness, efficiency, and life.

In the prior art, brightness and efficiency are inversely related, as are brightness and life. Unfortunately, the market demands that all three increase simultaneously or at least that brightness increase without decrease in efficiency or life.

An EL lamp is essentially a capacitor having a dielectric layer between two conductive electrodes, one of which is transparent. The dielectric layer can include a phosphor powder or there can be a separate layer of phosphor powder adjacent the dielectric layer. The phosphor powder radiates light in the presence of a strong electric field, using relatively little current.

A modern (post-1990) EL lamp typically includes transparent substrate of polyester or polycarbonate material having a thickness of about 7.0 mils (0.178 mm.). A transparent, front electrode of indium tin oxide or indium oxide is vacuum deposited onto the substrate to a thickness of 1000 A° or so. A phosphor layer is screen printed over the front electrode and a dielectric layer is screen printed over phosphor layer. A rear electrode is screen printed over the dielectric layer. It is also known in the art to deposit the layers by roll coating; e.g. see U.S. Pat. No. 5,830,028 (Zovko et al.).

The inks used for screen printing or roll coating include a binder, a solvent, and a filler, wherein the filler determines the nature of the printed, layer. A typical solvent is dimethylacetamide (DMAC) or ethylbutylacetate (EB acetate). The binder is typically a fluoropolymer such as polyvinylidene fluoride/hexafluoropropylene (PVDF/HFP), polyester, vinyl, epoxy or Kynar 9301, a proprietary terpolymer sold by Atofina. A phosphor layer is typically screen printed from a slurry containing a solvent, a binder, and zinc sulphide particles. A dielectric layer is typically screen printed from a slurry containing a solvent, a binder, and barium titanate ($BaTiO_3$) particles. A rear (opaque) electrode is typically screen printed from a slurry containing a solvent, a binder, and conductive particles such as silver or carbon. Because the solvent and binder for each layer are chemically the same or similar, there is chemical compatibility and good adhesion between adjoining layers.

Because an EL lamp is a capacitor, alternating current must be applied to the electrodes to cause the phosphor to glow, otherwise the lamp charges to the applied voltage, the current through the EL lamp ceases, and the lamp stops producing light. In portable electronic devices, automotive displays, and other applications where the power source is a low voltage battery, an EL lamp is powered by an inverter that converts low voltage, direct current into high voltage, alternating current. In order for an EL lamp to glow sufficiently, a peak-to-peak voltage in excess of about one hundred and twenty volts is necessary. The actual voltage depends on the construction of the lamp and, in particular, the field strength within the phosphor powder. The frequency of the alternating current through an EL lamp affects the life of the lamp, with frequencies between 200 hertz and 1000 hertz being preferred. Ionic migration occurs in the phosphor at frequencies below 200 hertz, leading to premature failure. Above 1000 hertz, the life of the phosphor is inversely proportional to frequency.

The prior art discloses several types of inverters in which the energy stored in an inductor is supplied to an EL lamp as a small current at high voltage as the inductor is discharged either through the lamp or into a storage capacitor. The voltage on a storage capacitor is pumped up by a series of high frequency pulses from the inverter. The direct current produced by inverter must be converted into an alternating current in order to power an EL lamp. U.S. Pat. No. 4,527,096 (Kindimann) discloses a switching bridge, known as an "H-bridge," for this purpose. The H-bridge acts as a double pole double throw switch to alternate current through the EL lamp at low frequency. U.S. Pat. No. 5,313,141 (Kimball) discloses an inverter that produces AC voltage directly. A plurality of inverters are commercially available using either technology.

Curiously, a bench power supply, i.e. a power supply coupled to line voltage, and an inverter are not equivalent power sources for operating an EL lamp. The brightness of some EL lamps may be greater on one supply or the other. In general, bench supplies have a generally constant, sinusoidal output voltage and provide whatever current is necessary to power an EL lamp. An EL lamp for bench supplies is designed for higher current to increase brightness. Inverters generally have limited current capability, variable output voltage, and high harmonic distortion, i.e. the output waveform is not sinusoidal.

In any circuit with impedances, such as an EL lamp, the current and the voltage are usually not in phase. Current is taken as a reference and the voltage either leads or lags the current. Mathematically, such a circuit is represented with complex numbers ($a \pm jb$) having a real or resistive component, a, and an imaginary or reactive component, b. Calculating true power can be difficult and the term "apparent power" is used for the product of the rms (root mean square) values of the real components of voltage and current.

In view of the foregoing, it is therefore an object of the invention to improve the brightness of an EL lamp without decreasing efficiency.

Another object of the invention is to improve the brightness of an EL lamp without decreasing lamp life.

A further object of the invention is to increase brightness and efficiency of an EL lamp driven from a current limited source.

Another object of the invention is to improve the efficiency of an EL lamp in terms of brightness per milliwatt of apparent power per unit area.

SUMMARY OF THE INVENTION

The foregoing objects are achieved in this invention in which it has been discovered that brightness is improved, without decreasing lamp life, by driving an EL lamp at higher voltage and less current, by increasing phosphor loading, and by printing the phosphor layer in two or more passes to produce a phosphor density of at least 6.5 milligrams per square centimeter of lamp surface area. A single, thicker layer can be deposited by roll coating.

BRIEF DESCRIPTION OF THE DRAWINGS

A more complete understanding of the invention can be obtained by considering the following detailed description in conjunction with the accompanying drawings, in which:

FIG. 2 is a cross-section of an EL lamp constructed in accordance with one aspect of the invention;

FIG. 3 is a cross-section of an EL lamp constructed( in accordance with a preferred embodiment of the invention;

DETAILED DESCRIPTION OF THE INVENTION

Figure 1:
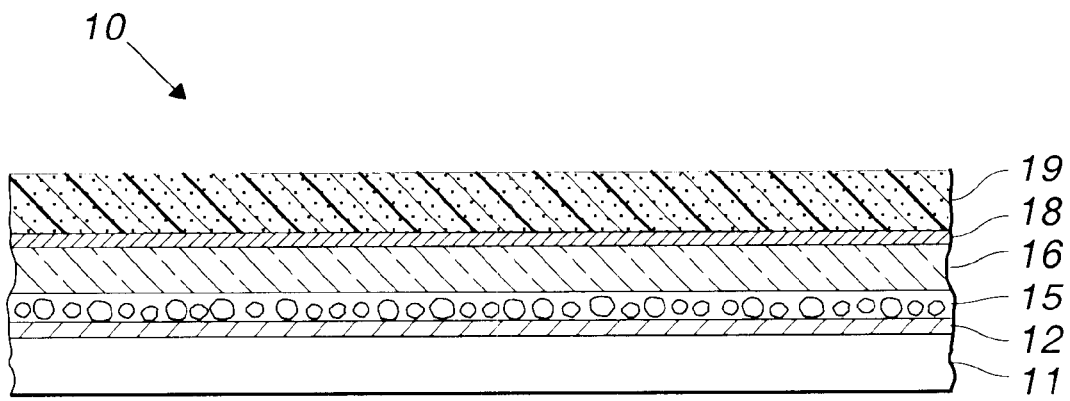
FIG. 1 is a cross-section of an EL lamp constructed in accordance with the prior art.

FIG. 1 is a cross-section of an EL lamp constructed in accordance with the prior art; The various layers are not shown in proportion. In lamp 10, transparent substrate 11 is a sheet of bi-axially oriented plastic such as polyester or polycarbonate. Transparent front electrode 12 overlies substrate 11 and is a thin layer of indium tin oxide or indium oxide. Phosphor layer 15 overlies the front electrode and dielectric layer 16 overlies the phosphor layer. Layers 15 and 16 are combined in some applications. Overlying dielectric layer 16 is opaque rear electrode 18. An optional backing layer 19 may also be provided, e.g. for sealing lamp 10. Typically, coated phosphor particles are used, eliminating the need for a sealing layer.

Typically, phosphor layer 15 includes phosphor particles in a ratio of 2:5 or less to the amount of binder, by weight, in an ink as used for screen printing. The amount of phosphor affects viscosity and the viscosity may be changed to suit a particular mode of application, e.g. roll coating rather than screen printing, or even a particular machine. In the above-identified patent to Zovko et al., the ratio was less than 1.5:1 for all examples given in the patent. The phosphor layer is essentially a single layer of particles, wherein the particles are randomly spaced from one another in a resin matrix. The minimum layer thickness is the diameter of the largest particle.

High phosphor loading is known in the art, at least in principle if not in concrete examples. Japanese Unexamined Patent Publication 2000-277258 (Naoyuki) describes an EL lamp having two phosphor layers separated by a conductive layer to provide two lamps having separately controlled colors. Phosphor loading is described as from 1:2 to 1:5 for one phosphor layer and as 1:3 to 1:8 for the second phosphor layer. The disclosed lamp uses barium titanate as the dielectric, which is not possible with a lamp constructed in accordance with the invention.

In accordance with the invention, it has been discovered that brightness can be significantly increased in EL lamps powered by driving an EL lamp at reduced current and increased voltage. It has been found that the combination of increasing the phosphor loading to at least 3.0:1, using titania as the dielectric, and printing the phosphor layer in: two or more passes to produce a phosphor density $\geq 6.5$ mg./cm$^2$, produces the desired increase in brightness, efficiency, and life.

FIG. 2 illustrates a lamp constructed in accordance with a first aspect of the invention. In FIG. 2, layers in common with FIG. 1 have the same reference numbers. Phosphor layer 21 includes a greater proportion of phosphor to binder, thereby increasing the number of particles per unit area. The phosphor is preferably coated but the invention is not dependent upon the particular kind of phosphor used or whether or not the phosphor is coated.

In accordance with another aspect of the invention, dielectric layer 22 is made from particles of titania ($TiO_2$) rather than barium titanate ($BaTiO_3$). Barium titanate has a higher dielectric constant than titania but titania has a lower loss than barium titanate. The use of titania as a dielectric is known in the prior art, e.g. see U.S. Pat. No. 5,770,920 (Eckersley et al.). A lamp type known as "RBC" sold by Durel Corporation uses titania as the dielectric. In a preferred embodiment of the invention, the titania layer included particles in the ratio of 1.5:1 to binder by weight in a screen printed ink. A useful amount is from approximately 1.5:1 to 2.5:1 by weight.

FIG. 3 illustrates an EL lamp made in accordance with a preferred embodiment of the invention. In this embodiment, phosphor layer 25 is made by at least two consecutive passes through a screen printer with an ink having a phosphor loading of 3.5:1. Although illustrated as producing two layers of particles, the particles actually settle into a single, dense layer before the ink dries completely. This procedure provides a higher phosphor density, $\geq 6.5$ mg./cm$^2$, and the brighter, more efficient lamps. An EL lamp having a phosphor layer printed in two passes is known in the art; e.g. an EL lamp known as "HS1+" sold by Durel Corporation has a phosphor layer made by two passes through a screen printer. However, the phosphor density is about half the minimum density for lamps made in accordance with the invention.

The following is an example of an EL lamp constructed in accordance with the invention.

| Phosphor layer | |
| --- | --- |
| Kynar 9301 resin | 14.60 grams |
| DMAC | 29.27 grams |
| (40% B44)* | 4.20 grams |
| Modaflow ® | 0.29 grams |
| Durel phosphor Type 225 | 52.64 grams |

*40% solution of Rohm & Haas resin Paraloid ® Acrylic Resin B-44 in DMAC; DMAC is dimethylacetamide Lamps were made with two passes (7.6 mg/cm$^2$), three passes (11.4 mg/cm$^2$), and four passes (15.4 mg/cm$^2$) with a screen mesh of 230. Other screen meshes can be used. The ink was cured at 132° C. for six minutes after each pass.

| Dielectric Layer | |
| --- | --- |
| DMAC | 47.69 grams |
| R700 (DuPont TiO$_2$) | 30.96 grams |
| Kynar 9301 powder | 20.73 grams |
| Modaflow | 0.47 grams |
| Disperbyk (D111) | 0.155 grams |

The ink was ball milled to assure full wetting of the dielectric, which is a rather fine powder. The dielectric was deposited in two passes through a 305 mesh screen for an average density of 3.3 mg/cm$^2$.

The rear electrode was of standard construction using carbon as the filler. A bus bar layer used silver as the filler.

An optional rear insulating layer was also applied to some lamps. A rear insulating layer provides additional environmental protection.

FIGS. 4–9 are charts comparing the performances of EL lamps operating under certain conditions. Lamps made as described above with Kynar 9301 binder are compared with lamps made using the same materials as an "RBC" lamp, which is commercially available from Durel Corporation. An RBC lamp has a titania dielectric layer and is included for comparison for that reason. Lamps made in accordance with the invention, including the modified RBC lamps, are significantly brighter than lamps made in accordance with the prior art. The single pass, modified RBC lamp (1p-RB-BRde) had a higher phosphor loading than the commercially available RBC lamp.

Figure 4:
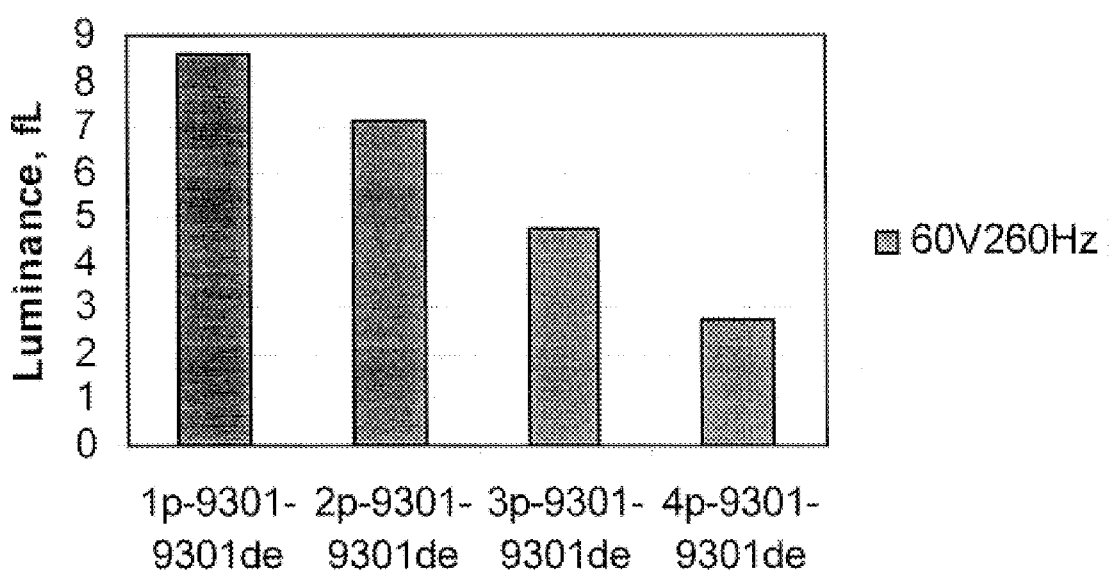
FIG. 4 is a chart comparing the brightness of several different EL lamps at constant voltage.
Figure 5:
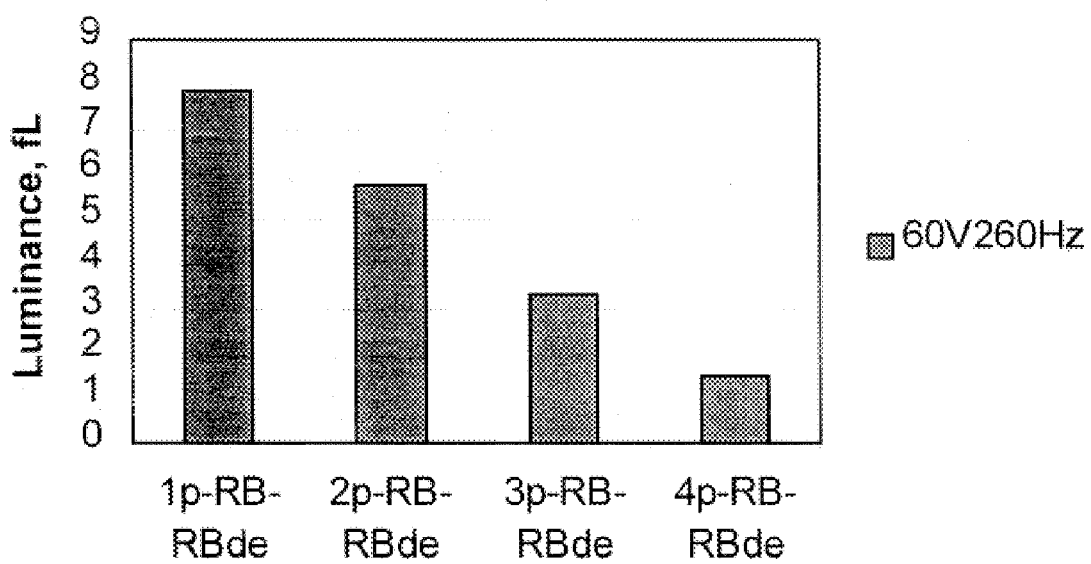
FIG. 5 is a chart comparing the brightness of several different EL lamps at constant voltage.
Figure 6:
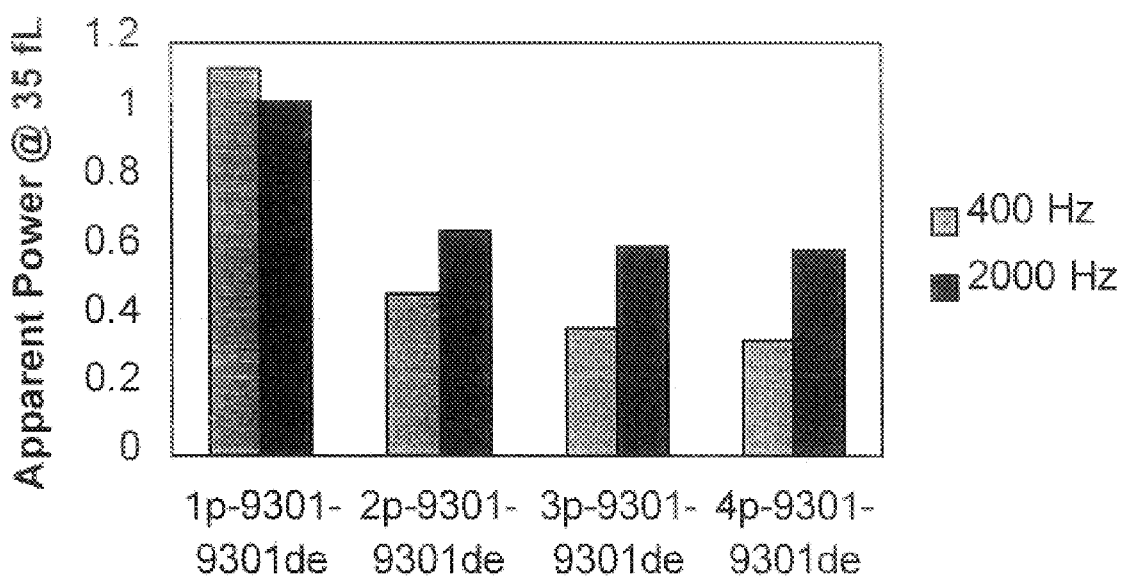
FIG. 6 is a chart comparing the apparent power of several different EL lamps at constant brightness.
Figure 7:
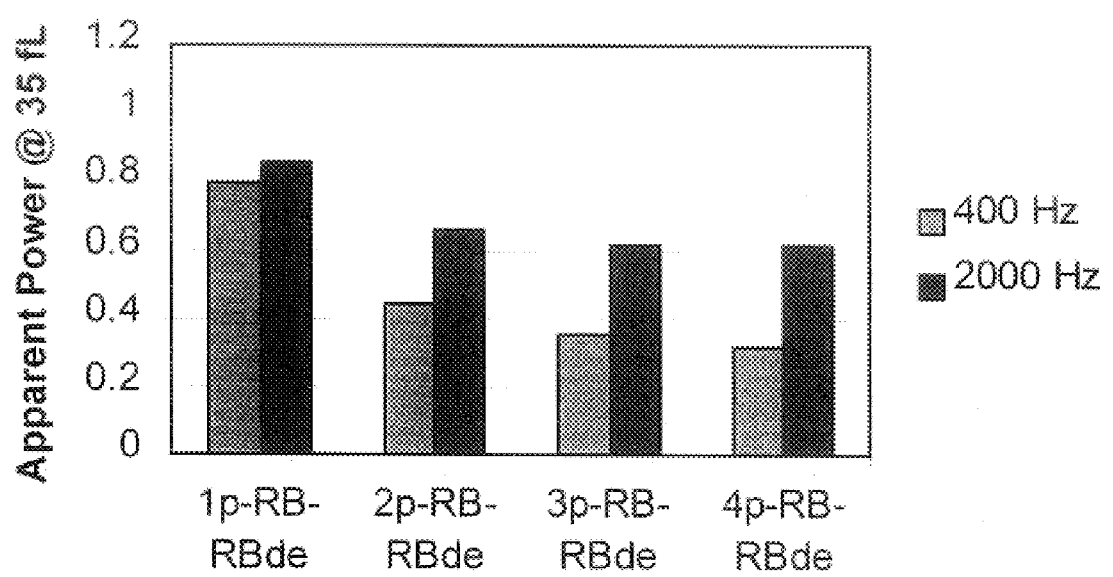
FIG. 7 is a chart comparing the apparent power of several different EL lamps at constant brightness.
Figure 8:
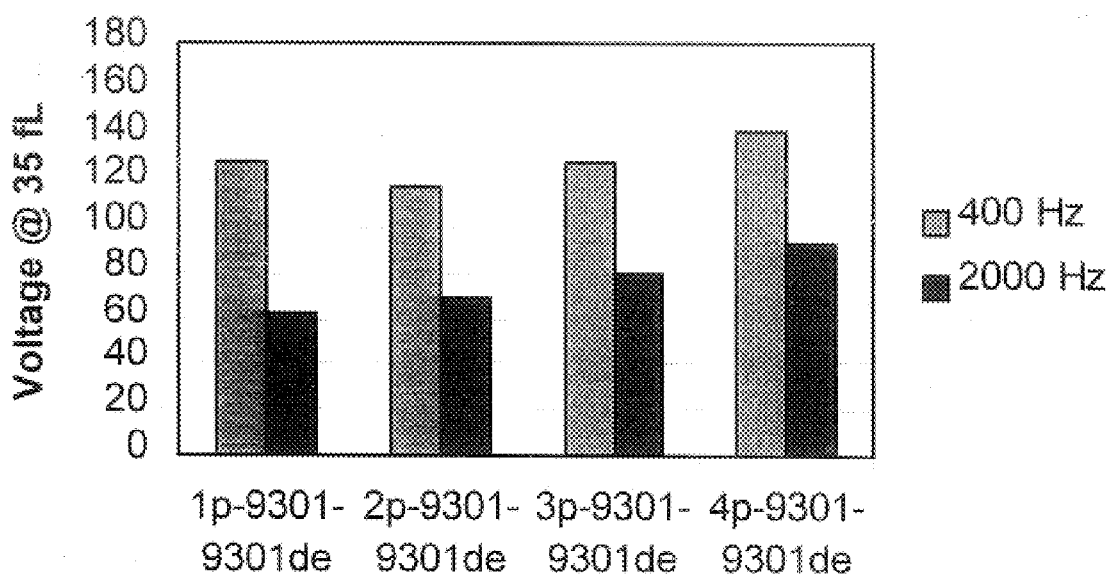
FIG. 8 is a chart comparing the applied voltage of several different EL lamps at constant brightness.
Figure 9:
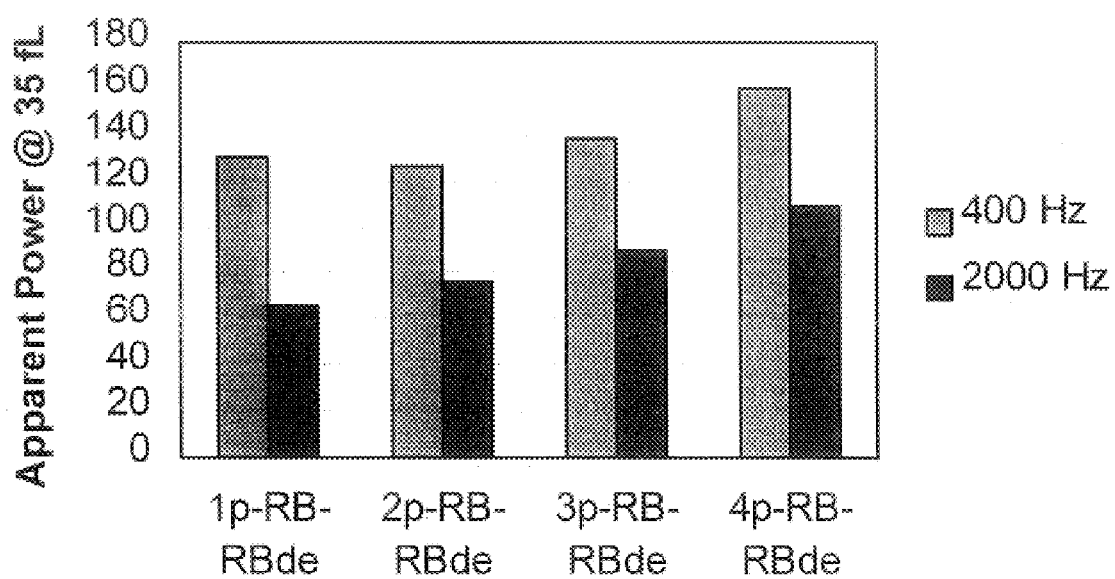
FIG. 9 is a chart comparing the applied voltage of several different EL lamps at constant brightness.

In FIG. 4, the applied voltage is a constant and the brightness appears to favor a lamp having a phosphor layer printed in a single pass. In FIG. 5, the same appears true for the modified RBC lamps. However, in FIG. 6, it is clear that the power needed to achieve a certain brightness, 35 foot-lamberts, is significantly lower with lamps made with higher phosphor loading. The modified RBC lamps, FIG. 7, show the same trend. The four pass lamps consume significantly less apparent power for a given luminance. FIG. 8 compares the voltages needed to achieve a particular luminance. The voltage decreases slightly and then increases at 400 Hz but increases with the number of passes at 2000 Hz. The reason for this is not entirely clear. The same is true for the modified RBC lamp, FIG. 9.

Preliminary life data indicates that a lamp constructed in accordance with the invention will last at least as long, and probably longer, than similar lamps of the prior art, despite the increase in brightness.

The invention thus improves the brightness of an EL lamp without decreasing efficiency or lamp life. Efficiency is greatly improved and it is believed that a lamp constructed in accordance with the invention can be optimized to be at least twice as bright as current lamps known in the art. A single pass, highly loaded, screen printed phosphor layer provides the greatest brightness but at the expense of current and power. Where brightness is the paramount consideration, the single pass, screen printed embodiment may be preferred for supplies capable of providing the necessary current, such as bench supplies.

Having thus described the invention, it will be apparent to those of skill in the art that various modifications can be made within the scope of the invention. For example, although described in conjunction with screen printing, other methods for depositing a phosphor layer can be used, such as roll coating. Prototype devices made by roll coating show the same trends as shown in FIGS. 4–9 but the applied voltage was quite high, around 300 volts. Although barium titanate is too lossy to be used in lamps constructed in accordance with the invention, other high dielectric constant, low loss, white dielectrics can be used instead, such as calcium titanate and strontium titanate. Titania is preferred because of its relatively low cost and wide availability.

What is claimed as the invention is:

1. A method for operating an electroluminescent lamp, said method comprising the steps of:
    applying an electrical current to an electroluminescent lamp having a phosphor to binder ratio of at least 3:1, a phosphor density a $\geq 6.5$ milligrams/cm$^2$ and a dielectric layer consisting essentially of titania in a resin binder;
    applying less current than would be used for an otherwise identical electroluminescent lamp having a phosphor to binder ratio of less than 3:1 and a phosphor density $\leq 6.5$ milligrams/cm$^2$.

2. The method as set forth in claim 1 and further including the step of:
    applying a voltage to the lamp that is greater than would be used for an electroluminescent lamp having a phosphor loading of less than 3:1 and a phosphor density $\leq 6.5$ milligrams/cm$^2$.

3. In an EL lamp including a first conductive layer, a second conductive layer, and a dielectric layer and a phosphor layer between said first conductive layer and said second conductive layer, said dielectric layer and said phosphor layer each including a binder and a filler, wherein the filler in said phosphor layer is phosphor and said phosphor layer is characterized by a ratio of phosphor to binder greater than 3:1 and a phosphor density $\geq 6.5$ milligrams/cm$^2$, and wherein the filler in said dielectric layer consists essentially of titania.

4. The EL lamp as set forth in claim 3 wherein said phosphor layer is characterized by a ratio of phosphor to binder greater than 3.5:1.

5. The EL lamp as set forth in claim 3 wherein said phosphor layer is characterized by a ratio of phosphor to binder less than approximately 5:1.

6. The EL lamp as set forth in claim 3 characterized by a screen printed phosphor layer deposited in at least two passes.

* * * * *